United States Patent

Wright

[15] 3,699,457

[45] Oct. 17, 1972

[54] NOISE BLANKER CIRCUIT INCLUDING RATE BIAS AND RATE SHUTOFF CIRCUITRY AND AUDIO BLANKING

[72] Inventor: Larry R. Wright, Mount Prospect, Ill.

[73] Assignee: Motorola, Inc., Franklin Park, Ill.

[22] Filed: Aug. 11, 1971

[21] Appl. No.: 170,862

Related U.S. Application Data

[63] Continuation-in-part of Ser. No. 839,163, July 7, 1969, Pat. No. 3,601,703.

[52] U.S. Cl. ..................325/479, 325/348, 325/402, 325/405, 325/405, 325/410, 325/474, 325/478

[51] Int. Cl. ..............................................H04b 1/10

[58] Field of Search.....................325/322–324, 377, 325/472–480, 348, 402, 405, 410; 328/165–167

[56] References Cited

UNITED STATES PATENTS 3,284,714 11/1966 Battin et al. ...............325/348

*Primary Examiner*—Albert J. Mayer
*Attorney*—Vincent J. Rauner et al.

[57] ABSTRACT

A noise blanking circuit for decreasing the impulse noise in a receiver includes a noise channel which develops blanking pulses in response to impulse noise. The noise pulses are coupled to a stage in the signal path for blanking the signals coupled therethrough to eliminate the reproduction of impulse noise. A rate shutoff circuit includes first and second timing circuits which are responsive to the repetition rate of the blanking pulses, and the duration of a series of pulses respectively, to develop a rate shutoff signal which inhibits the coupling of the blanking pulses to the blanking circuit. A rate bias circuit, coupled to the rate shutoff circuit, is responsive to the rate shutoff signal to develop a rate bias signal to maintain the gain of the noise amplifiers at a desired level. An audio blanking circuit is coupled to the rate shutoff circuit and the receiver squelch circuit and is responsive to the blanking pulses exceeding a predetermined rate and duration to develop an audio blanking pulse for inhibiting operation of the receiver audio circuitry. The audio blanking circuit further includes timing circuitry which is responsive to the blanking pulses exceeding a predetermined rate and duration to inhibit development of the audio blanking signal when the rate shutoff function is operative.

16 Claims, 1 Drawing Figure

PATENTED OCT 17 1972 3,699,457
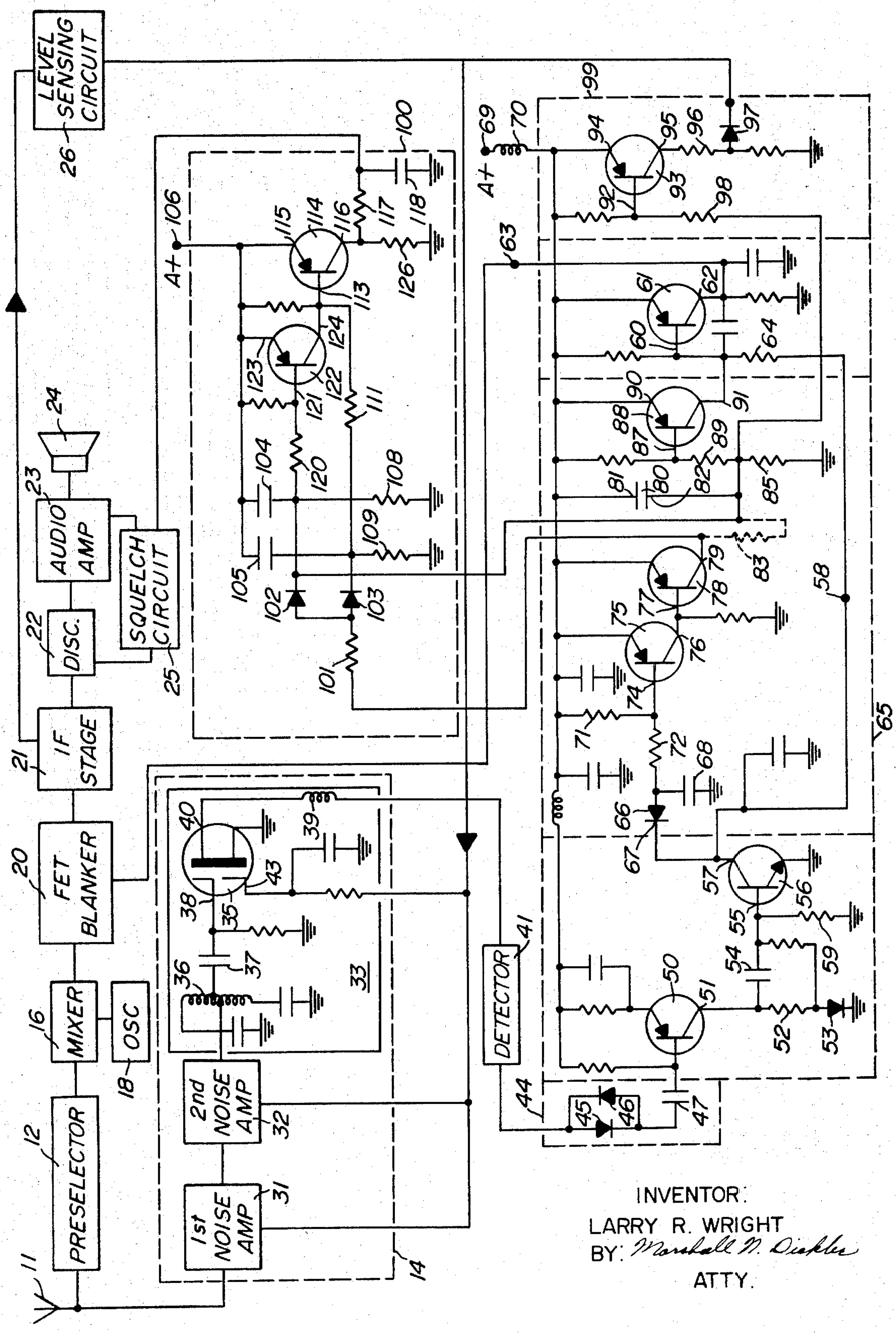
INVENTOR:
LARRY R. WRIGHT
BY: Marshall M. Dickler
ATTY.

NOISE BLANKER CIRCUIT INCLUDING RATE BIAS AND RATE SHUTOFF CIRCUITRY AND AUDIO BLANKING

BACKGROUND

Impulse noise disturbances which are superimposed on radio waves can seriously impair the translation of a desired signal within a radio receiver. The problem may be particularly critical in mobile communications equipment, wherein impulse noise energy from ignition systems, high voltage leakage, lightening flashes and the like are coupled to a highly sensitive receiver and appear as undesirable audio output.

Many types of devices are known for minimizing or eliminating such impulse noise disturbances. One such device is described and claimed in Pat. application Ser. No. 36,717, filed May 13, 1970 now U.S. Pat. No. 3,623,144 and assigned to Motorola Inc., the assignee of the present application. This system employs field effect transistors as blanking elements in the signal path, which blank the undesirable impulse noise disturbances. If the impulse noise interference is particularly acute, the blanking elements will operate at a very high rate, chopping segments out of the signals in the signal path. When the signals are chopped for a short period of time, the "hole" developed in the signal is normally filled in with energy stored in the following sections of the receiver, such as the filter, and is not noticeable in the audio output. However, there is a limited amount of energy stored in the subsequent stages of the receiver and if the blanking persists for to long a period of time, this stored energy is exhausted and the "hole" is filled in with noise generated in the subsequent receiver stages.

Noise blanking systems may include a rate shutoff circuit which senses an excessive blanking rate and duration and develops a rate shutoff signal. The rate shutoff signal inhibits the pulse amplifiers from coupling the blanking pulses to the blanking circuit. Prior art rate shutoff circuits have responded to average pulse energy. They would exhibit a large shift in the rate shutoff operating point when the source of the pulse energy changed from a heterodyne to an impulse type noise disturbance.

Audio blankers have also been provided which inhibit the audio amplifier stages of a radio when impulse noise disturbances are present. Prior audio blanking systems which may operate in conjunction with blankers in the signal channel portion of the radio, provided audio blanking at the same time as the noise channel blanking, and not at the point in time when audio blanking would be most valuable. Furthermore, audio blankers also exhibited a shift in operating point when the source of the pulse energy from a heterodyne to an impulse type noise.

Noise blanking systems may also include level sensing circuitry which senses the signal level in the signal path and develops a level sensing signal which varies in accordance with the signal level. The level sensing signal is coupled to the noise channel amplifiers to change the gain thereof in accordance with the signal level in the signal path. If however, the rate shutoff circuitry has inhibited the blanking pulses, impulse noise will be coupled to the stage to which the level sensing circuit is coupled. The level sensing circuit will therefore sense an increased signal level and develop a level sensing signal which reduces the gain of the impulse noise channel. This may reduce the gain of the impulse noise channel sufficiently to deactivate the rate shutoff circuit and also inhibit operation of the noise blanker. Impulse noise will then continue being coupled to the level sensing circuit, thus continuing the level sensing signal. As a result of this apparent feedback system, the impulse noise rate must be lowered to a point much lower than that necessary to initiate rate shutoff before the level sensing circuit will allow the resumption of normal blanking.

SUMMARY

It is an object of this invention to provide a noise blanking circuit which senses the repetition rate and duration of various types of impulse noise disturbances and inhibits blanking in response to the various types of impulse noise disturbances.

Another object of this invention is to provide a noise blanking circuit for a radio receiver which inhibits reproduction of audio signals when the impulse noise disturbances exceed a predetermined repetition rate and duration and which is responsive to various types of impulse noise disturbances.

Yet another object of this invention is to provide a noise blanker circuit for a radio receiver which prevents high level signals in the signal path from causing a decrease in the noise channel gain when the repetition rate and duration of the impulse noise disturbances exceeds a predetermined level.

In practicing this invention, a radio receiver is provided which includes receiving, amplifying and mixing circuitry capable of receiving developing, and passing on-channel and adjacent channel signals along with impulse noise. The signals are coupled through noise blanking elements for blanking the signals coupled therethrough to eliminate the reproduction of impulse noise. A noise channel, which includes amplifiers having a variable gain characteristic, and pulse amplifiers, receives and amplifies the impulse noise, and develops blanking pulses therefrom which are coupled to the blanking elements. The blanking elements are responsive to the blanking pulses to chop holes in the signals at a time when the impulse noise is passing therethrough to eliminate the impulse noise.

A rate shutoff circuit is included in the noise channel. The rate shutoff circuit includes a first timing circuit for measuring the repetition rate of the blanking pulses and a second timing circuit for measuring the duration of a series of the pulses. A rate shutoff signal will be developed when the blanking pulses exceed a predetermined rate and duration. The rate shutoff signal is coupled to the pulse amplifiers for inhibiting the pulse amplifiers from coupling the blanking pulses to the blanking circuit.

An audio blanker circuit is also coupled to the rate shutoff circuit and to the radio receiver squelch circuitry. The audio blanking circuit is responsive to a signal from the rate shutoff first timing circuit, which measures the repetition rate of the blanking pulses. The audio blanking circuit includes a first timing circuit for measuring the duration of the series of pulses whose repetition rate is measured by the rate shutoff first timing circuit. When the blanking pulses exceed a predetermined repetition rate and duration, which is less than the duration necessary to operate the rate shutoff circuit, and more than that necessary to operate the blanking elements, an audio blanking signal will be developed which is coupled to the receiver squelch circuitry for rendering the audio circuitry inoperative. A second timing circuit is also provided in the audio blanking circuit having a timing constant identical to the rate shutoff second timing circuit. This will operate when the rate shutoff function occurs to inhibit further audio blanking.

A rate bias circuit is coupled to the rate shutoff circuit and is responsive to the operation thereof to develop a rate bias signal. The rate bias signal is coupled to the noise channel amplifiers for maintaining the amplifiers at the desired amplification characteristic. This acts to prevent the level sensing circuit from inhibiting proper operation of the rate shutoff circuit, and prevents the occurrence of a "lockup condition."

DESCRIPTION OF THE DRAWING

The single FIGURE of the drawing is a combination schematic and block diagram of the noise blanking circuit of this invention.

DETAILED DESCRIPTION

Referring to the drawing, a combined schematic and block diagram of a frequency modulated (FM) radio receiver including an intermediate frequency (IF) blanker circuit, and an audio blanker circuit, is shown. Both desired and undesired radio waves, which may be accompanied by impulse noise disturbances, are received by antenna 11 and applied both to RF preselector 12 and noise amplifier 14. Preselector 12, which may be a passive circuit, is tuned to the desired frequency and has at least the necessary bandwidth for receiving the desired signal. Because of the difficulty of obtaining selectivity at very high radio frequencies, some unwanted information bearing signals, particularly adjacent channel signals, may be passed through preselector 12.

The RF noise amplifier 14 which will be further described in a subsequent portion of this application, is utilized to amplify the impulse noise, although it will amplify any signal within its bandpass. It may be tuned to a frequency just outside the bandpass of preselector 12 so that there is not a division of the desired signal therebetween. For example, RF preselector 12 may be tuned to 140 MHz and have a bandpass of 3 MHz, and noise amplifier 14 may be tuned to 130 MHz. It is recommended that noise amplifier 14 be tuned at a frequency at least 3 MHz away from the center frequency of preselector 12.

Any radio frequency signals selected by preselector 12 are mixed in mixer circuit 16, which may include a field effect transistor (FET), with a signal from local oscillator 18 to derive the desired IF signal, perhaps along with adjacent channel unwanted signals. Provided that an impulse noise disturbance is not being received by antenna 11, the output of mixer 16 is filtered by the selectivity of FET noise blanking elements 20, such as that described in copending Pat. application, Ser. No. 36,717, filed on May 13, 1970, now U.S. Pat. No. 3,623,144 and assigned to the same assignee. The output of blanking elements 20 is coupled to a selective IF stage 21, which provides most of the selectivity for the receiver, and which selects the desired IF signal. Discriminator 22, which is connected to the output of IF stage 21, demodulates the audio signal from the IF signal. Audio amplifier 23, which is connected to the output of discriminator 22, amplifies and applies the demodulated signal to speaker 24.

A squelch circuit 25 senses the presence of modulated signals, and the absence of noise at discriminator 22, and energizes audio amplifier 23 to allow the demodulated audio signal to be amplified therein and coupled to speaker 24.

If an impulse noise disturbance is received by antenna 11, it will be conducted to both preselector 12 and to noise amplifier 14. Noise amplifier 14, in the embodiment shown, is a three stage amplifier, each stage being substantially the same as the other. Stages 31 and 32 are shown in block diagram form, while stage 33, the third noise amplifier, is shown in schematic diagram representation.

Noise amplifier 33, includes a FET amplifier 35 for amplifying the impulse noise. In this embodiment, FET 35 is a dual gate MOSFET. The impulse noise signals are coupled from second noise amplifier 32 through a portion of coil 36, and DC blocking capacitor 37 to gate 38 of FET 35. The amplified impulse noise signals are coupled from drain 40 through coil 39 to noise detector 41. Gate 43 of FET 35 has a bias voltage applied thereto for controlling the gain of FET 35 as do the FET's in amplifiers 31 and 32. Varying the bias voltage at gate 43 will vary the amplification characteristics of FET 35.

The amplified impulse noise is demodulated in noise detector 41 and applied to noise threshold gate 44. Noise threshold gate 44 includes diodes 45 and 46 coupled in parallel, and conductive in opposite directions, for allowing amplified demodulated impulse noise of negative polarity to be coupled therethrough. Diode 46 allows the negative demodulated and amplified impulse noise, which exceeds a predetermined level, to be coupled therethrough to capacitor 47. Diode 45 acts to provide a charge path to capacitor 47, preventing it from developing a charge thereon which would inhibit the impulse noise signals from being coupled therethrough. Capacitor 47 couples the impulse noise from diodes 45 and 46 to first pulse amplifier 50, and also acts to limit the impulse noise to a predetermined period.

Negative going impulse noise disturbances coupled to first pulse amplifier 50, which is slightly conductive, renders amplifier 50 fully conductive, causing a positive going pulse to appear at collector 51. This positive going pulse, if it is great enough to exceed the reference turn-on point established by diode 53, and the voltage divider consisting of resistors 52 and 59, is coupled through DC coupling capacitor 54 to base 55 of second pulse amplifier 56, causing amplifier 56 to conduct and develop a negative going pulse at collector 57, which approaches ground potential. This negative going pulse is coupled by conductor 58 through resistor 64 to base 60 of third pulse amplifier 61, rendering amplifier 61 conductive. When amplifier 61 is rendered conductive, it develops a positive going pulse which is the blanking pulse, at collector 62. In the preferred embodiment, the peak value of this positive going pulse is about 9 volts. Conductors 63 couples the blanking pulse from collector 62 to FET blanker elements 20, thereby interrupting all signals passing through the signal channel for the duration of the blanking pulse. As this occurs at the time the impulse noise passes through blanker elements 20, it prevents the impulse noise disturbance from being reproduced by the receiver speaker and degrading the reproduced audio quality.

A level sensing circuit 26 is also provided, such as that described in co-pending Patent Application, Serial No. 160,854 filed on July 8, 1971 and assigned to the same assignee. Level sensing circuit 26 is coupled to IF amplifier stage 21 and to bias gate 43 of dual gate MOSFET 35. When the desired on-channel signals, and/or adjacent channel signals, and/or undesired on-channel signals are below a predetermined level in IF stage 21, a bias signal, developed by level sensing circuit 26 and coupled to gate 43, causes MOSFET 35 to have a predetermined or normal amplification characteristic. When the desired on-channel signals, and/or adjacent channel signals, and/or undesired on-channel signals in IF stage 21 increase beyond the predetermined level, a reduced voltage is coupled to gate 43 from level sensing circuit 26 causing a decrease in the amplification characteristics of MOSFET 35, and therefore of third noise amplifier 33. As level sensing circuit 26 is coupled to the gates of all three noise amplifiers, a decrease in the level sensing voltage coupled from level sensing circuit 26 will cause a decrease in the amplification characteristics of amplifiers 31 and 32 as well as amplifier 33. Varying the amplification characteristic of the noise amplifier stages makes the stages less susceptible to noise impulses of low amplitude, and therefore reduces the blanking rate. This is desirable as it eliminates the blanking pulses produced by low level impulse noise disturbances, when the signal in the IF stage is great enough to make the effects caused by these low impulse noise disturbances negligible.

A rate shutoff circuit 65 is provided which senses the repetition rate and duration of various types of impulse noise disturbances and inhibits blanking in response to the various types of impulse noise disturbances. Referring to the rate shutoff circuit, anode 67 of diode 66 is coupled to collector 57 of second pulse amplifier 56. The negative going pulses produced by second pulse amplifier 56 when it is rendered conductive, render diode 66 conductive. This provides a discharge path for capacitor 68 through diode 66 and transistor 56 to ground potential, which completely discharges capacitor 68. A charge potential for capacitor 68 is provided at A+ terminal 69, through RF choke 70, biasing resistor 71 and resistor 72. Capacitor 68 and resistors 71 and 72 are selected such that capacitor 68 will develop a voltage there-across at a predetermined rate when diode 66 is rendered nonconductive. The junction of resistors 71 and 72 is coupled to base 74 of transistor 75. Each time second pulse amplifier 56 conducts and discharges capacitor 68, the voltage at base 74 of transistor 75 will be reduced sufficiently to cause transistor 75 to become forward biased. Transistor 75 will remain forward biased for the duration of each pulse. After each pulse, capacitor 68 will begin to develop a voltage thereacross. When the voltage exceeds a predetermined level, transistor 75 will be rendered nonconductive. If the pulses developed at collector 57 of transistor 56 exceed a predetermined repetition rate, the voltage developed across capacitor 68 between pulses will be insufficient to render transistor 75 nonconductive. In the embodiment shown, transistor 75 will be maintained continuously in a forward biased state when the repetition rate exceeds approximately 70 KHz. Capacitor 68 then acts as a timing capacitor for timing the repetition rate of the pulses.

When transistor 75 becomes forward biased, a voltage is developed at collector 76 which is coupled to base 77 of transistor 78, rendering transistor 78, which is normally conductive, nonconductive. Capacitor 80 has terminal 81 thereof, coupled to A+ at terminal 69 through RF choke 70. A second terminal 82 is coupled to collector 79 of transistor 78 through resistor 83. Resistor 83 is shown in dashed lines. Transistor 78 normally acts to provide a low impedance path across capacitor 80 preventing a voltage from being developed thereacross. When transistor 78 is rendered nonconductive, the low impedance path is removed from across capacitor 80, allowing the capacitor to charge through a path from ground potential, through resistor 85, to terminal 82 of capacitor 80. In the embodiment shown, capacitor 80 will charge to a predetermined desired negative voltage with respect to A+ potential at terminal 82 in approximately 2.5 milliseconds. As transistor 78 is rendered nonconductive in response to the pulses at collector 57 of transistor 56 exceeding a predetermined repetition rate, and remains deactivated for a long as that repetition rate continues, the voltage developed across capacitor 80 will vary in accordance with the duration of blanking pulses which exceed the predetermined pulse repetition rate.

Terminal 82 of capacitor 80 is coupled to base 87 of transistor 88 through resistor 89. When the voltage at terminal 82 exceeds the predetermined negative level, with respect to A+ potential, transistor 88 will be rendered conductive, coupling a positive potential from emitter 90 to collector 91. This positive potential is coupled from collector 91 to base 60 of third pulse amplifier 61, preventing amplifier 61 from being rendered conductive in response to a pulse applied over conductor 58. With third pulse amplifier 61 rendered nonconductive, blanking pulses cannot be developed which would be coupled by conductor 63 to FET blanking elements 20 to interrupt the signals passing through the signal channel. Rate shutoff circuit 65 therefore operates in response to blanking pulses developed in the pulse amplifiers which exceed a predetermined rate and duration to inhibit further blanking in FET blanker 20 which could degrade the receiver audio response characteristics. As separate timing circuits are used to measure the repetition rate and duration of the blanking pulses, changes in the type of impulse noise disturbance, such as a change from a hetrodyne to an impulse noise disturbance will not cause a shift in the rate shutoff operating point.

A rate bias circuit 99 is also provided which is responsive to the blanking pulses exceeding the above stated repetition rate and duration to develop a rate bias signal. The negative potential with respect to A+ potential developed at terminal 82 of capacitor 80 is coupled through resistor 98 to base 92 of transistor 93. When this voltage exceeds the above stated predetermined level, transistor 93 will becomes forward biased, causing supply potential to be coupled from emitter 94 to collector 95 of transistor 93. This potential is coupled through resistor 96 and diode 97 to gate 43 of MOSFET 35, causing MOSFET 35 to be maintained at a predetermined or normal amplification characteristic. The rate bias voltage is also coupled to the identical gates in noise amplifiers 31 and 32 to maintain their normal amplification characteristics. This acts to prevent the level sensing circuit from inhibiting proper operation of the rate shutoff circuit, due to a decreased amplification in the noise channel which eliminates the possibility of what is commonly referred to as a "lockup condition" from occurring. This lockup condition occurs when the blanking signals occur at a very high rate. The high blanking rate can cause operation of rate shutoff circuit 65 and level sensing circuit 26. Level sensing circuit 26 will develop a level sensing signal which is coupled to noise amplifier 14 to reduce the gain in noise amplifiers 31, 32 and 33. This may reduce the gain of the noise channel sufficiently to deactivate rate shutoff circuit 65 and blanking elements 20. Impulse noise will then continue being coupled to level sensing circuit 26, thus continuing the level sensing signal. As a result of this apparent feedback system, the impulse noise rate must be lowered to a point much lower than that necessary to initiate the rate shutoff condition before the level sensing circuit 26 will allow the resumption of normal blanking. A delay in resumption of normal blanking is undesirable under these circumstances as it will cause a degradation in quality of the reproduced audio signals. The rate bias circuit 99, as it is coupled to rate shutoff circuit 65 will not provide a rate bias signal until such time as the repetition rate and duration of the blanking pulses exceed that necessary to initiate the rate shutoff signal. Furthermore, rate bias circuit 99, in the same manner as rate shutoff circuit 65, has the same operating point even when the source of the pulse energy changes from a heterodyne to an impulse type noise disturbance.

Audio blanking circuit 100 may or may not be used in association with the rate and bias shutoff circuitry and the RF blanking circuitry shown in the preferred embodiment. If audio blanking circuit 100 is used, resistor 83 in rate shutoff circuit 65, shown in dashed lines, is omitted. This resistor is replaced by the equivalent resistance of the input circuitry of audio blanker circuit 100.

Collector 79 of transistor 78 is coupled through resistor 101 and diode 102 in audio blanker circuit 100 to terminal 82 of capacitor 80 in rate shutoff circuit 65, in order to complete the discharge path for capacitor 80. Resistor 101, diode 102 and transistor 78, in addition to providing a discharging path for capacitor 80, provide a discharge path for capacitor 104. Diode 103, resistor 101 and transistor 78 provide a discharge path across capacitor 105 when the blanking pulses developed by transistor second pulse amplifier 56 are below the predetermined repetition rate of the rate shutoff circuit. Capacitors 104 and 105 have one terminal connected to A+ terminal 106. Capacitor 104 has a second terminal coupled to reference potential through resistor 108, and capacitor 105 has its second terminal coupled to reference potential through resistor 109.

When the blanking pulses developed by second pulse amplifier 56 exceed the predetermined rate shutoff repetition rate, and transistor 78 is rendered nonconductive, the discharge path across capacitors 104 and 105 is eliminated. Capacitors 104 and 105 begin to charge towards a negative voltage level with respect to A+ potential through their respective resistors 108 and 109. Capacitor 105 and resistor 109 are selected such that the junction therebetween will charge to a predetermined voltage level in approximately 150 microseconds. Capacitor 104 and resistor 108 are selected such that they effectively duplicate the timing constants of capacitor 80 and resistor 85 in rate shutoff circuit 65. That is, the junction of capacitors 104 and resistor 108 will reach a predetermined voltage level after a time period of approximately 2.5 milliseconds.

The voltage developed at the junction of resistor 109 and capacitor 105 is coupled through resistor 111 to base 113 of transistor 114. Transistor 114 will be rendered conductive when the negative voltage with respect to A+ potential at junction 109 exceeds a predetermined level, coupling and A+ voltage at emitter 115 to collector 116 of transistor 114. Resistor 117, coupled to collector 116, and capacitor 118, coupled between one terminal of resistor 117 and ground potential act as an integrator to integrate the voltage developed at collector 116. The voltage developed across capacitor 118 is coupled to squelch circuit 25, thereby inhibiting operation of audio amplifier 23. This effectively blanks the audio signal at a point in time when blanking is still occurring in FET blanker elements 20. However, the blanking rate at this time is great enough to produce a "hole" of such duration of the signal that the stored energy in the subsequent stages would be exhausted and noise would be coupled to audio amplifier 23 and speaker 24. The audio blanker then operates at a time when excessive blanking would degrade the receiver audio response, and before such time as the rate shutoff function has been initiated.

Should the pulse repetition rate continue for a period of time in excess of the necessary to institute the audio blanking function and, in the preferred embodiment, for a period of 2.5 milliseconds, the junction of resistor 108 and capacitor 104 will charge to a predetermined negative voltage level with respect to A+ potential. This negative voltage is coupled through resistor 120 to base 121 of transistor 122 rendering transistor 122 conductive. With transistor 122 conductive, A+ potential at emitter 123 is coupled to collector 124 of transistor 122, and to base 113 of transistor 114. The A+ potential renders transistor 114 nonconductive and prevents if from responding to the voltage coupled from the junction of capacitor 105 and resistor 109. With transistor 114 nonconductive, capacitor 118 will discharge through resistor 117 and resistor 126, thereby allowing squelch circuit 25 to return to its normal operating conditions and thus eliminating the audio blanking function.

As can be seen, a noise blanking circuit has been provided which senses the repetition rate and duration of various types of impulse noise disturbances by use of two timing circuits, and inhibits blanking in response to the various types of impulse noise disturbances exceeding a predetermined rate and duration. An audio blanking circuit is also provided which includes timing circuitry. The audio blanking circuit is responsive first to the blanking pulses exceeding the rate shutoff repetition rate for a predetermined duration to inhibit reproduction of audio signals, and second, to render itself inoperative when the repetition rate and duration of the blanking pulses exceeds the point at which a rate shutoff function is initiated. Furthermore, rate bias circuitry is provided for use when the noise blanker circuit includes level sensing circuitry so that the rate shutoff function is not rendered valueless by operation of the level sensing circuit.

I claim:

1. A noise blanking circuit for use in a radio receiver having a first circuit for conducting and translating a desired signal which may be accompanied by undesired signals and impulse noise disturbances, a second circuit for repeating the desired signal, and a third circuit coupling said first circuit to said second circuit and which is adapted to be interrupted by the application of blanking pulses thereto, said noise blanking circuit including in combination, amplifying means connected to said first circuit for amplifying said impulse noise disturbances, pulse circuit means coupled to said amplifying means and operative in response to the impulse noise disturbances to develop blanking pulses, means coupling said pulse circuit means to said third circuit for applying said blanking pulses thereto to interrupt said third circuit, and rate shutoff means coupled to said pulse circuit means and including first timing means for measuring the repetition rate of said blanking pulses, and second timing means for measuring the duration of a series of said pulses, said rate shutoff means being operative in response to said blanking pulses exceeding a predetermined rate and duration to develop a rate shutoff signal, said pulse circuit means being responsive to the rate shutoff signal to inhibit the coupling of said blanking pulses to said third circuit.

2. The noise blanking circuit of claim 1 wherein said first timing means of said rate shutoff means is coupled to said pulse circuit means and responsive to the blanking pulses developed therein to develop a first timing signal which varies in accordance with the repetition rate of said blanking pulses, and second timing means coupled to said first timing means and to said pulse circuit means, said second timing means being responsive to said first timing signal exceeding a predetermined level to develop a second timing signal, said second timing signal varying in accordance with the duration of said first timing signal exceeding said predetermined level, said pulse circuit means being responsive to said second timing signal exceeding a predetermined level to inhibit said pulse generation means from coupling said blanking pulses to said third circuit.

3. The noise blanking circuit of claim 2 wherein said first and second timing means each includes reactance means for developing said first and second timing signals.

4. The noise blanking circuit of claim 3 wherein said first timing means includes, first reactance means coupled to said pulse circuit means and responsive to the blanking pulses developed therein to develop said first timing signal, first transistor means coupled to said first reactance means and operative to maintain a first state when said first timing signal is below said predetermined level, and maintain a second state when said first timing signal exceeds said predetermined level, and said second timing means includes second reactance means coupled to said first transistor means and responsive to said first transistor means being maintained in said second state to develop said second timing signal, said second timing signal varying in accordance with the duration of said second state of said first transistor means, second transistor means coupled to said second reactance means and to said pulse circuit means and responsive to said second timing signal exceeding a predetermined level to develop said rate shutoff signal for inhibiting said pulse circuit means from coupling said blanking pulses to said third circuit.

5. The noise blanking circuit of claim 4 wherein said pulse circuit means includes a plurality of stages, including first and second stages, said rate shutoff means being coupled to said first stage for receiving said blanking pulses therefrom, and being coupled to said second stage, said second stage being operative in response to said rate shutoff signal to inhibit said blanking pulses from being coupled to said third circuit.

6. The noise blanking circuit of claim 5 wherein said pulse circuit means includes three stages, each including a transistor pulse amplifier, said rate shutoff means being coupled to said second stage for receiving said blanking pulses therefrom and to said third stage for coupling said rate shutoff signal thereto, said third transistor pulse amplifier stage being rendered nonconductive in response to said rate shutoff signal to inhibit said blanking pulses from being coupled to said third circuit.

7. The noise blanking circuit of claim 6 wherein said amplifying means has variable amplification characteristics, and further including rate bias means coupled to said rate shutoff means and to said amplifying means, said rate bias means being operative in response to said rate shutoff signal to develop a rate bias signal for maintaining said amplifying means at a desired amplification characteristic.

8. The noise blanking circuit of claim 7 wherein said rate bias means includes transistor means coupled to said rate shutoff means and to said amplifying means, said transistor means being operative in response to said rate shutoff signal to change states and develop a rate bias signal for maintaining said amplifying means at a desired amplification characteristic.

9. The noise blanking circuit of claim 1 wherein said receiver further includes audio reproduction means and squelch means for rendering said audio reproduction means operative in the presence of said desired signals, and wherein said blanking circuit further includes, audio blanking means coupled to said rate shutoff means and responsive to said blanking pulses exceeding a predetermined repetition rate and duration to develop an audio blanking signal, said squelch circuit being operative in response to said audio blanking signal to render said audio reproduction means inoperative.

10. The noise blanking circuit of claim 9 wherein said audio blanking means includes third timing means coupled to said rate shutoff means, said third timing means being responsive to said first timing signal exceeding said predetermined level to develop a third timing signal, said third timing signal varying in accordance with the duration of said first timing signal, and circuit means coupled to said third timing means and operative in response to said third timing signal exceeding said predetermined level to develop said audio blanking signal, said squelch means being responsive to said audio blanking signal to render said audio reproduction means inoperative.

11. The noise blanking circuit of claim 10 wherein said third timing means includes reactance means for developing said third timing signal.

12. The noise blanking circuit of claim 11 wherein said audio blanking means further includes fourth timing means coupled to said first timing means and to said pulse circuit means, said fourth timing means being responsive to said first timing signal exceeding said predetermined level to develop a fourth timing signal, which varies in accordance with the duration of said first timing signal, said circuit means responsive to said fourth timing signal exceeding a predetermined level to inhibit development of said audio blanking signal.

13. The noise blanking circuit of claim 12 wherein said fourth timing means includes reactance means for developing said fourth timing signal.

14. A noise blanking circuit for use in a receiver having a first circuit for conducting and translating a desired signal which may be accompanied by undesired signals and impulse noise disturbances, a second circuit for repeating the desired signal, a third circuit coupling said first circuit to said second circuit and which is adapted to be interrupted by the application of blanking pulses thereto, an audio reproducing circuit for reproducing the audio signals, and a squelch circuit for rendering said audio reproduction circuit operative in response to presence of said desired signal, said noise blanking circuit including in combination, amplifying means having a variable amplification characteristic connected to said first circuit for amplifying said impulse noise disturbances, pulse circuit means coupled to said amplifying means and operative in response to said impulse noise disturbances to develop blanking pulses, means coupling said pulse circuit means to said third circuit for applying said blanking pulses thereto to interrupt said third circuit, rate shutoff means coupled to said pulse circuit means and including first timing circuit means for measuring the repetition rate of said blanking pulses and second timing means for measuring the duration of a series of said pulses, said rate shutoff means being operative in response to said blanking pulses exceeding a first predetermined rate and duration to develop a rate shutoff signal and apply the same to said pulse circuit means, said pulse circuit means being responsive to the rate shutoff signal to inhibit said pulse circuit means from coupling said blanking pulses to said third circuit, rate bias circuit means coupled to said rate shutoff means and to said amplifying means and responsive to said blanking pulses exceeding a predetermined rate and duration to develop a rate bias signal for maintaining said amplifier means at a desired amplification characteristic, and audio blanking means coupled to said rate shutoff means and to said squelch means, said audio blanking means being operative in response to said blanking pulses exceeding said predetermined repetition rate for a second predetermined duration to develop an audio blanking signal, said squelch circuit being responsive to said audio blanking signal to inhibit operation of said audio reproducing means.

15. The noise blanking circuit of claim 14 wherein said audio blanking circuit includes third timing means coupled to said rate shutoff means and responsive to said first timing signal exceeding said second predetermined duration of develop said audio blanking signal, and fourth timing means coupled to said rate shutoff means and responsive to said first timing signal exceeding a third predetermined duration to develop a fourth timing signal for inhibiting development of said audio blanking signal.

16. The noise blanking circuit of claim 14 wherein said audio blanking means includes third timing means coupled to said rate shutoff means and responsive to said first timing signal to develop a third timing signal which varies in accordance with the duration of said first timing signal, first transistor means operative in response to said third timing signal exceeding a predetermined level to develop said audio blanking signal, fourth timing means coupled to said rate shutoff means and responsive to said first timing signal to develop a fourth timing signal, said fourth timing signal varying in accordance with the duration of said first timing signal, and second semiconductor means coupled to said fourth timing means and said first transistor means and responsive to said fourth timing signal exceeding a predetermined level to inhibit operation of said first transistor means.

* * * * *